United States Patent [19]
Torii

[11] Patent Number: 5,547,037
[45] Date of Patent: Aug. 20, 1996

[54] CONSTANT-SPEED CRUISE CONTROL DEVICE FOR A VEHICLE

[75] Inventor: Yoshinari Torii, Gamagori, Japan

[73] Assignee: Nippondenso Co., Ltd., Kariya, Japan

[21] Appl. No.: 447,815

[22] Filed: May 23, 1995

[30] Foreign Application Priority Data

May 23, 1994 [JP] Japan .................... 6-108656

[51] Int. Cl.⁶ .................... B60K 31/02
[52] U.S. Cl. .................... 180/178
[58] Field of Search .................... 123/325, 326; 180/170, 176, 177, 178, 179

[56] References Cited

U.S. PATENT DOCUMENTS

| 4,860,210 | 8/1989 | McCombie | 180/176 |
| 4,917,206 | 4/1990 | Hara | 180/179 |
| 5,031,715 | 7/1991 | Ogawa et al. | 180/179 |

FOREIGN PATENT DOCUMENTS

| 1-12931 | 1/1989 | Japan | 180/178 |
| 1142235 | 6/1989 | Japan | |
| 1141129 | 6/1989 | Japan | |
| 292741 | 4/1990 | Japan | |
| 58658 | 1/1991 | Japan | |
| 3136928 | 6/1991 | Japan | |
| 344929 | 7/1991 | Japan | |
| 4173435 | 6/1992 | Japan | |

*Primary Examiner*—Richard M. Camby
*Assistant Examiner*—Frank Vanaman
*Attorney, Agent, or Firm*—Cushman, Darby & Cushman

[57] ABSTRACT

When an IDLE switch goes on and so a condition of strong possibility of fuel cutoff is obtained, a throttle degree of opening is immediately opened slightly and an IDLE switch goes off, and thereby actual entry of an electronic-control fuel-injection device into fuel cutoff processing can be prevented. Moreover regulation of the throttle degree of opening to a closed side is blunted by enlargement of an insensitive zone of a difference between target cruising speed and vehicle speed, and so the throttle degree of opening does not change and a rise of vehicle speed Vn continues for a while. Because of this, a large cycle of vehicle change is repeated and so physical sensations do not deteriorate.

18 Claims, 8 Drawing Sheets

FIG. 11A THROTTLE OPENING

FIG. 11B IDLE SWITCH

PRIOR ART

FIG. 12A VEHICLE SPEED

FIG. 12B THROTTLE OPENING

FIG. 12C IDLE SWITCH

CONSTANT-SPEED CRUISE CONTROL DEVICE FOR A VEHICLE

CROSS REFERENCE TO RELATED APPLICATION

This application is based upon and claims priority from Japanese Patent Application No. Hei. 6-108656 filed May 3, 1994, the contents of which are incorporated herein by reference.

BACKGROUND OF THE INVENTION

1. Field of the Invention

The present invention relates to a constant-speed cruise control device for a vehicle, and more particularly, to a constant-speed cruise control device for a vehicle also provided with a fuel cutoff control device to stop fuel supply to an internal combustion engine in a case where a fuel cutoff condition has been obtained.

2. Related Art

Conventionally, a constant-speed cruise control device for a vehicle is a device which, when a vehicle-speed setting switch for constant-speed cruising use has been operated after a driver has depressed an accelerator pedal and accelerated to a desired vehicle speed, performs control so that the vehicle speed at that time is established as a vehicle speed for constant-speed cruising use and thereafter causes a difference between vehicle speed and established vehicle speed to be zero, for example regulating a throttle degree of opening to cause the vehicle to cruise automatically at a uniform speed. A vehicle mounted with this device is extremely convenient in that there normally exists no need to depress the accelerator pedal in a case of uniform-speed travel on an expressway or the like.

When a vehicle mounted with the constant-speed cruise control device as described above is cruising at constant speed at a previously set target vehicle speed, the foregoing constant-speed cruise control device performs control so as to close the throttle valve in a case where vehicle speed becomes larger than target vehicle speed due to gravitational acceleration, for example, at entry into a steep descending slope. Moreover, the throttle valve is closed to a fully closed position in a case where the difference does not easily become zero.

However, in a case where the vehicle is mounted with a fuel cutoff control device, if an idle switch goes on while during the foregoing full closure of the throttle, a fuel cutoff condition is established and fuel is no longer supplied to the internal combustion engine, and so output torque of the internal combustion engine drops sharply and vehicle speed also drops sharply. In a case where vehicle speed becomes smaller than target vehicle speed, the foregoing constant-speed cruise control device opens the throttle valve and attempts to increase speed. In this way, the idle switch goes off, fuel cutoff control stops, and fuel is supplied, and so the output torque of the internal combustion engine rises sharply and vehicle speed also rises sharply. If vehicle speed rises and exceeds the target vehicle speed, the throttle valve is again closed and the idle switch goes on, whereupon fuel cutoff is started and vehicle speed drops sharply. This phenomenon is repeated thereafter as long as descending slopes continue. That is, as shown in FIGS. 12A–C, vehicle speed comes to change in small steps up to the timing from X to Y.

This vehicle-speed fluctuation is termed fuel cut/surge, and is physically an extremely unpleasant phenomenon.

SUMMARY OF THE INVENTION

It is an object of the present invention to prevent the above-described small-step vehicle-speed fluctuation and improve physical sensations of a vehicle passenger.

To attain the above object, in the present invention, regulation blunting means blunts regulation of drive power by drive power regulating means in a case of having determined by fuel cutoff condition detecting means during constant-speed cruise control that a fuel cutoff condition or a condition wherein a possibility of fuel cutoff is strong has been obtained. That is to say, because the regulation changes to operation which is more sluggish than ordinarily or to operation which stops until a difference larger than a certain extent is obtained, immediate stopping of fuel cutoff or, conversely, immediate starting of fuel cutoff does not occur. That is to say, the change cycle for vehicle speed becomes longer. Consequently, the physically unpleasant phenomenon of small-step change in vehicle speed on descending slopes can be prevented.

Furthermore, it is also acceptable for the drive power regulating means to regulate drive power of the internal combustion engine by regulating a throttle valve degree of opening of the internal combustion engine.

Additionally, it is also acceptable for the drive power regulating means to regulate the internal combustion engine by a regulated quantity or a regulated speed determined from the difference based on a map established previously to indicate a relationship between a difference between vehicle speed and target cruising speed, and a regulated quantity or a regulated speed.

It is also acceptable for the regulation blunting means to cause to blunt the regulation of the drive power by the drive power regulating means, by stopping the regulation of the drive power by the drive power regulating means when the difference between the vehicle speed and target cruising speed is a predetermined difference or less. The regulation of the drive power is not performed when the difference is the predetermined difference or less, and the regulation of the drive power is performed only after the difference becomes larger than the predetermined difference. Consequently, drive power regulation is blunted.

It is also acceptable for the drive power regulating means to regulate the internal combustion engine by a regulated quantity or a regulated speed determined from the difference in a case where the difference is a predetermined difference or more on the basis of a map established previously to indicate a relationship between a difference between the vehicle speed and the target cruising speed, and a regulated quantity or a regulated speed, and for the regulation blunting means to blunts the regulation of the drive power by the drive power regulating means, by enlarging the predetermined difference. When the predetermined difference is enlarged, the drive power is thereby not regulated even if the difference becomes slightly larger. That is to say, the regulation of the drive power is blunted by enlarging the predetermined difference.

It is also acceptable for the regulation blunting means to cause to blunt the regulation of the drive power by the drive power regulating means, by enlarging the predetermined difference only on a side where the vehicle speed is larger than the target cruising speed. Because the predetermined difference is not enlarged in a case where the vehicle speed is smaller than the target cruising speed, the regulation of the drive power does not become blunted. However, because there is oscillation between the sides where the vehicle speed is larger than and smaller than the target cruising speed, overall processing can blunt the drive power regulation even when enlarging the predetermined difference only on the side where the vehicle speed is larger than the target cruising speed.

Conversely, it is also acceptable for the regulation blunting means to blunt the regulation of the drive power by the drive power regulating means, by enlarging the predetermined difference only on a side where the vehicle speed is smaller than the target cruising speed. Because there is oscillation between the sides where the vehicle speed is larger than and smaller than the target cruising speed, as was described above, overall processing can blunt the drive power regulation even when enlarging the predetermined difference only on the side where the vehicle speed is smaller than the target cruising speed.

It is also acceptable for the regulation blunting means to blunt the regulation of the drive power by the drive power regulating means by enlarging the predetermined difference on both sides where the vehicle speed is larger than and smaller than the target cruising speed. Because there is oscillation between the sides where the vehicle speed is larger than and smaller than the target cruising speed, as was described above, the blunting can be made more effective.

Moreover, it is also acceptable for the regulation blunting means to blunt the regulation by the drive power regulating means after once elevating the drive power by the drive power regulating means in a case of having determined by the fuel cutoff condition detecting means during constant-speed cruise control that a fuel cutoff condition or a condition wherein a possibility of fuel cutoff is strong has been obtained. Even if the regulation of the drive power is blunted, a sudden drop in the vehicle speed occurs immediately after entering the fuel cutoff condition. Consequently, if blunting processing is done after once causing the drive power to rise by the drive power regulating means and stopping fuel cutoff at an early period or causing the fuel cutoff not to occur, the initial sudden speed drop of the fuel cutoff is prevented, and physical sensations can be further improved.

Additionally, in substitution of the regulation blunting means, it is also acceptable to provide regulation stopping means to stop the regulation of the drive power by the drive power regulating means at a predetermined regulated position in a case of having determined by the fuel cutoff condition detecting means during the constant-speed cruise control that a fuel cutoff condition or a condition wherein a possibility of fuel cutoff is strong has been obtained. The drive power of the internal combustion engine is fixed at a predetermined state by this structure, and so although the drive power may change gradually, the change is comparatively stabilized, and physical sensations do not deteriorate.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 11A and 11B are timing charts indicating a state of vehicle speed, throttle degree of opening, and IDLE switch on a steep descending slope according to the present embodiment; and FIGS. 12A–C are timing charts indicating a state of vehicle speed, throttle degree of opening, and IDLE switch on a steep descending slope according to the prior art.

DETAILED DESCRIPTION OF THE PREFERRED EMBODIMENTS

An embodiment according to the present invention will be described hereinafter with reference to FIGS. 1 to 11.

Figure 1:
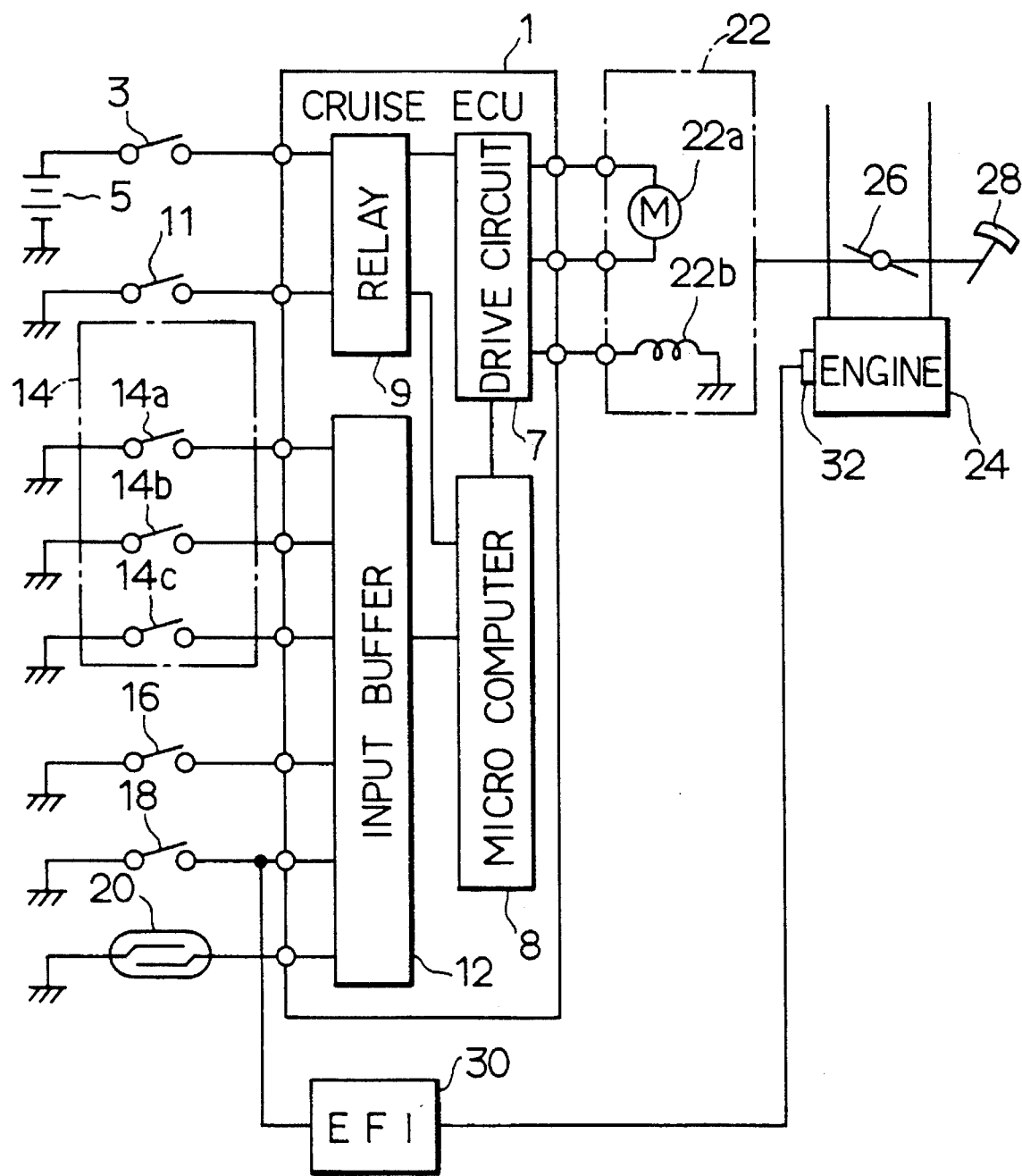
FIG. 1 is an overall structural view of a constant-speed cruise control device according to an embodiment.

FIG. 1 is an overall structural view of a constant-speed cruise control device according to the present embodiment. The present constant-speed cruise control device is mounted together with an electronic-control fuel-injection device (EFI) in an automobile equipped with a gasoline engine.

A battery 5 is connected via an ignition switch 3 to a cruise ECU 1 to execute constant-speed cruise control. Electrical power is supplied to the cruise ECU 1 by "on" operation of this ignition switch 3, and operation of a microcomputer 8 becomes possible. Additionally, electrical power is supplied via a main relay 9 to an actuator drive circuit 7 incorporated within the cruise ECU 1. This main relay 9 is connected to a main switch 11 for constant-speed cruise control use, and through "on" operation of this main switch 11, the main relay 9 goes on, an electrical power is supplied to the actuator drive circuit 7, and operation of the actuator drive circuit 7 becomes possible.

The microcomputer 8 is structured as an ordinary microcomputer provided with ROM, RAM, input/output, bus line, and the like. Signals from various sensors and switches are input to this microcomputer 8 via an input buffer 12. According to the present embodiment, signals are input from control switches 14 for constant-speed cruise control use, a STOP lamp switch 16 which goes on in a case where a driver depresses a brake pedal, an IDLE switch 18 which goes on when the throttle degree of opening is fully closed, and a vehicle speed sensor (vehicle speed detecting means) 20 which generates a signal of a frequency proportionate to the speed of the vehicle. The foregoing control switches 14 are provided with a SET switch 14a, a RESUME switch 14b, and a CANCEL switch 14c. The SET switch 14a, RESUME switch 14b, and CANCEL switch 14c are switches of a type which goes on only when in a pressed state and goes off immediately when the pressed state is released.

The microcomputer 8 sequentially executes program instructions stored in ROM and, as required, outputs a drive instruction signal to the actuator drive circuit 7.

The actuator drive circuit 7 is a drive circuit for driving an actuator 22 and, in accordance with the drive instruction signal from the microcomputer 8, outputs actuator drive signal corresponding to the drive instruction signal to a motor 22a and clutch 22b provided within the actuator 22. For example, normal rotation and reverse rotation of the motor 22a as well as rotating speed thereof are controlled by output of the actuator drive circuit 7. Additionally, when the clutch 22b is electrified by output of the actuator drive circuit 7, rotation of the motor 22a is transmitted to a throttle valve 26 of an engine 24. Because of this, the microcomputer 8 can regulate drive power of the engine 24, and as a result thereof, it becomes possible to control running speed of the vehicle.

Additionally, as a known structure, an accelerator pedal 28 and the throttle valve 26 are interconnected so that the amount of depression of the accelerator pedal 28 is also interlocked with the throttle valve degree of opening. Moreover, depression operation of the accelerator pedal 28 and rotation operation of the motor 22a in a state of interconnection with the throttle valve 26 by the clutch 22b are respectively independently operable, but of both operations, the operation of the one wherein the throttle degree of opening is larger is reflected in rotation of the throttle valve 26. Consequently, when the accelerator pedal 28 has been depressed, the throttle degree of opening comes to correspond to the depression amount of the accelerator pedal 28, even if the motor 22a rotates so that the throttle valve 26 is fully closed. Conversely, when the motor 22a rotates in the direction of opening the throttle valve 26, the throttle degree of opening comes to correspond to the rotation of the motor 22a, even if the accelerator pedal 28 is not depressed. This structure is well known and so a detailed description will be omitted.

An electronic-control fuel-injection device (EFI) 30 is provided in addition to the above-described constant-speed cruise control device. This electronic-control fuel-injection device 30 calculates a required amount of fuel in accordance with load and the like to the engine 24, and supplies fuel from an injector 32 into intake air. Furthermore, the electronic-control fuel-injection device 30 also performs fuel cutoff control at a predetermined fuel cutoff condition, herein being a condition whereby the IDLE switch 18 goes on during cruising and the state thereof continues for a predetermined time (for example, 500 msec).

Next, constant-speed cruise control processing executed by the foregoing microcomputer 8 will be described with reference to flowcharts and the like shown in FIG. 2 and after.

Figure 2:
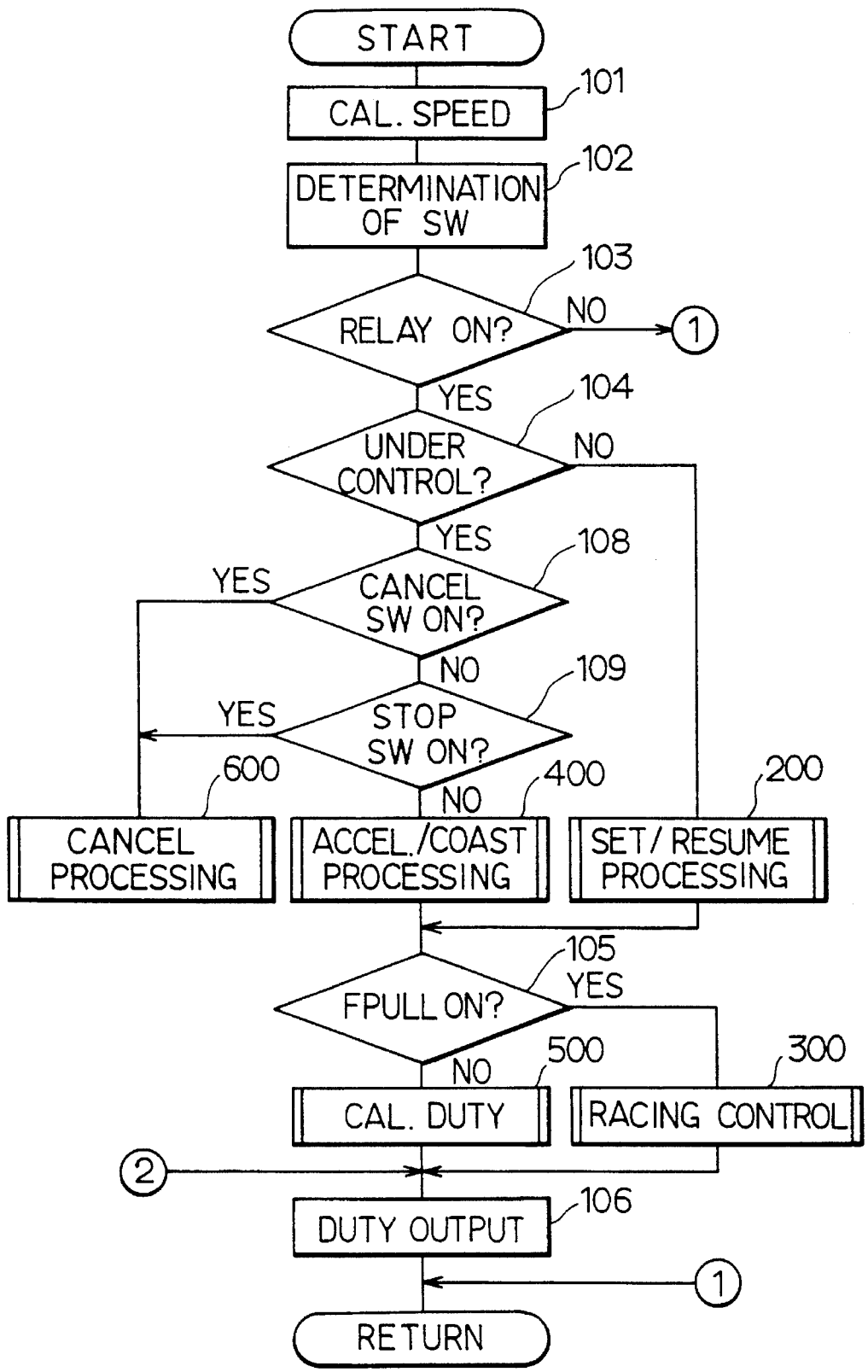
FIG. 2 is a flowchart of constant-speed cruise control processing performed by the constant-speed cruise control device.

The constant-speed cruise control processing indicated in FIG. 2 is performed at every control cycle T (for example, 48 msec) when electrical power is supplied to the microcomputer 8 of the cruise ECU 1 by "on" operation of the ignition switch 3, and is processing whereby output duty cycle(%) is determined from calculated vehicle speed, switch input, and so on, and the motor 22a of the actuator 22 is electrified for T×duty/100.

Firstly, the cycle of signals from the vehicle speed sensor 20 is read in and the present vehicle speed (vehicle speed: Vn) is calculated (step 101). Next, on-off determination of the respective switch inputs of the control switches 14, STOP lamp switch 16, and IDLE switch 18 is performed (step 102). Next, an "on" state of the main relay 9 is determined (step 103). This is done so as to disable a transfer to constant-speed cruise control when the main relay 9 has not gone on, because electrical power is not being supplied to the actuator drive circuit 7. That is, when the main relay 9 has not gone on, processing for duty cycle calculation and so on is not performed and the control cycle ends without change, and the start of the next control cycle is awaited.

If the main relay 9 has gone on, a decision whether constant-speed cruise control is in progress is made next (step 104). Control executed in this processing and after is decided on the basis of the input signals from the control switches 14.

In a case of determination in step 104 that control is not in progress, set/resume processing (step 200) is executed next. This processing is to determine the setting of constant-speed cruise control. Setting, by pressing the SET switch 14a in a state of no constant-speed cruise control, causes the vehicle speed Vn at that time to be read in, causes the vehicle speed Vn to be established at the target vehicle speed Vt and memory vehicle speed Vm, and causes constant-speed cruise control to be performed. Resume will be described later.

Figure 3:
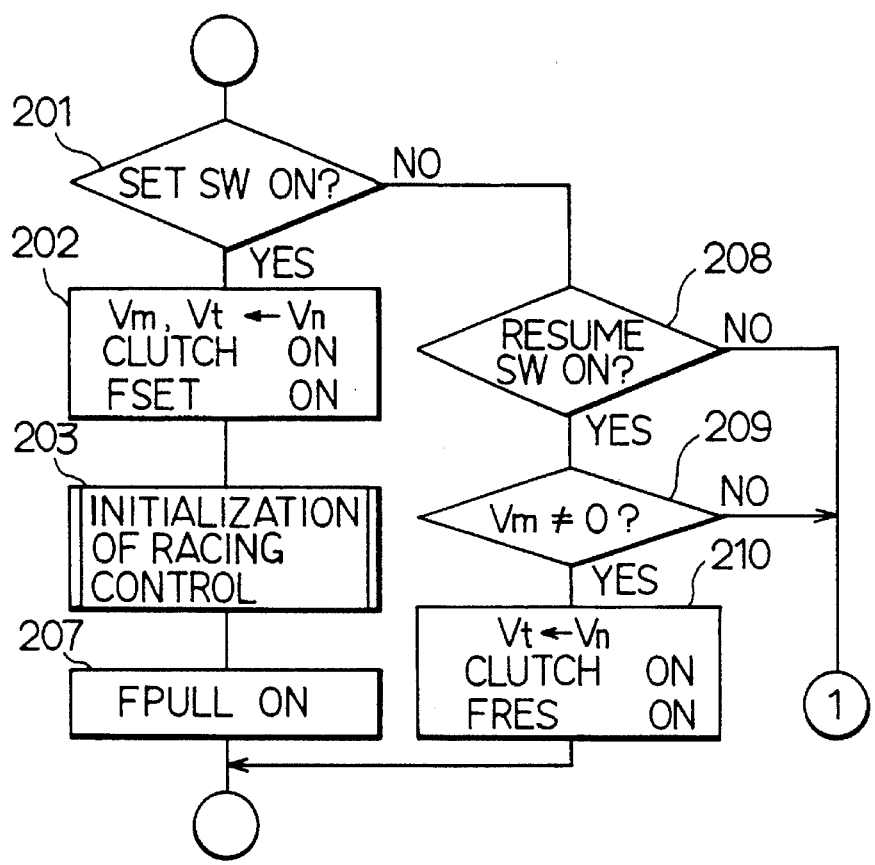
FIG. 3 is a flowchart of set/resume processing therewithin.

The details of set/resume processing (step 200) are indicated in FIG. 3. Firstly, an "on" state of the SET switch 14a is determined (step 201), and if the SET switch 14a is on, the vehicle speed Vn calculated in the last execution q step 101 is established to be the target vehicle speed Vt and memory vehicle speed Vm, makes the clutch 22b go on so that rotation of the motor 22a is linked to the throttle valve 26, and moreover makes a "set" flag FSET go on (step 202). Accordingly, moreover, initialization processing of racing control (step 203) to prevent a vehicle speed drop during setting is performed.

A vehicle speed drop during setting refers to a momentary drop in vehicle speed wherein, immediately after setting, the motor 22a of the actuator 22 is at a fully closed position and a delay occurs in rotation from this position to a throttle degree of opening at which constant-speed cruising is possible. To prevent this, the motor 22a of the actuator 22 is momentarily driven to the open side immediately after setting. The calculation of this amount to drive the motor 22a is performed in setting-time racing initialization processing (step 203).

Figure 5:
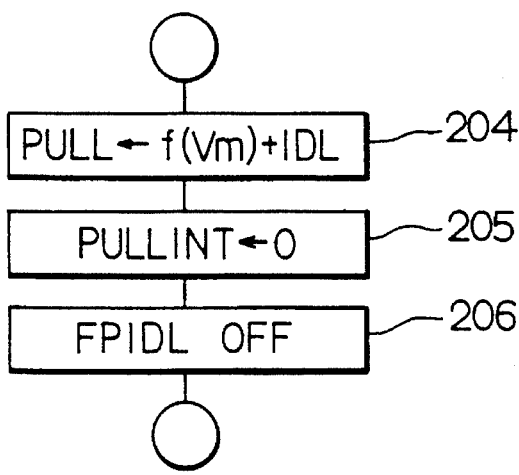
FIG. 5 is a flowchart of setting-time racing initialization processing therewithin.

FIG. 5 indicates a detailed flowchart of setting-time racing initialization processing. Firstly, the quantity PULL to drive the motor 22a to the open side (corresponding to the number of repetitions during constant-speed cruise control), as indicated by the following Equation 1, is calculated as the sum of a quantity f (Vm) determined as a function of the memory vehicle speed Vm, and of a predetermined value IDL (step 204).

$$PULL \leftarrow f(Vm) + IDL \qquad \text{(Equation 1)}$$

The predetermined value IDL corresponds to the amount of play in the link system, throttle link system, and so on of the actuator 22.

Next, the quantity PULLINT to be described later is cleared to zero (step 205), furthermore a flag FPIDL to be described later goes off (step 206), and setting-time racing initialization processing (step 203) is ended. Next, a flag FPULL signifying that racing control is in progress goes on (step 207). Consequently, in the next determination of racing control being in progress, i.e., in determination that the flag FPULL is on (step 105), an affirmative determination is made and racing control (step 300) is executed.

Figure 6:
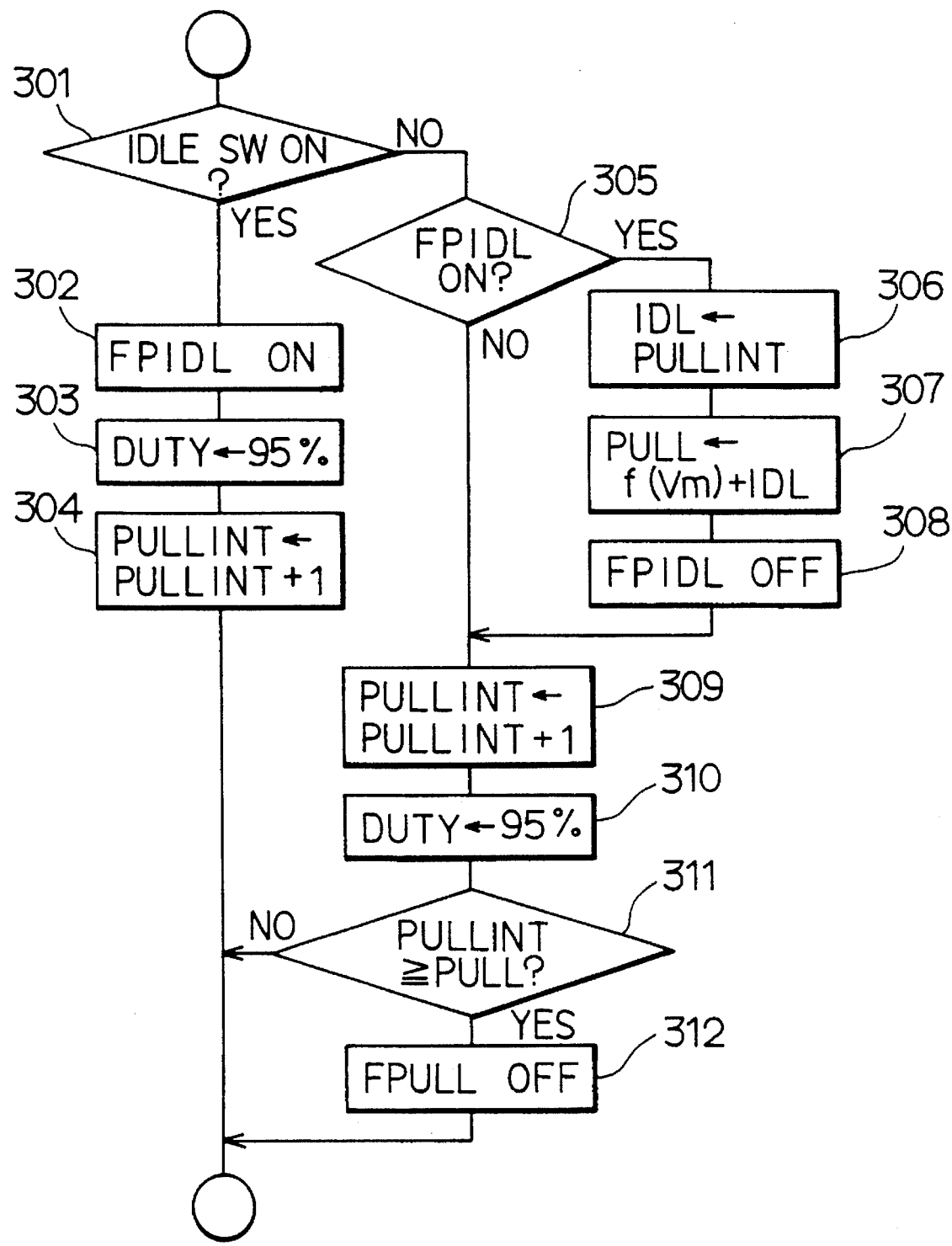
FIG. 6 is a flowchart of racing control therewithin.

The details of racing control are indicated in FIG. 6. The IDLE switch 18 going on at the time of initial setting in the processing of step 200 signifies that the present degree of opening of the motor 22a of the actuator 22 is still in a position of play, and that the throttle valve 26 is in a fully closed position.

Consequently, firstly the "on" state of the IDLE switch 18 is determined (step 301), and if on, the flag FPIDL goes on to indicate that an "on" state of the IDLE switch 18 during racing control has been detected (step 302), and subsequently a fixed duty cycle (as high-speed drive use, for example, duty cycle of 95%) is taken to be the output duty cycle so that the actuator is driven at high speed to the open side (step 303). At this time, moreover, the number of times that fixed duty cycle signal has been output is counted by the counter PULLINT (step 304). Consequently, in duty cycle signal output processing (step 106), the motor 22a rotates at high speed by 95% duty cycle and rotation corresponding to play is rapidly eliminated.

In the next control cycle, again, when processing begins from step 101, after passing through steps 102 and 103, constant-speed cruise control is in progress and so affirmative determination is made in step 104, and "on" determination of the CANCEL switch 14c (step 108) and "on" determination of the STOP lamp switch 16 (step 109) are done, but because both switches are off at this time, negative determinations are made, and there is a transition to accelerate/coast processing (step 400).

Figure 4:
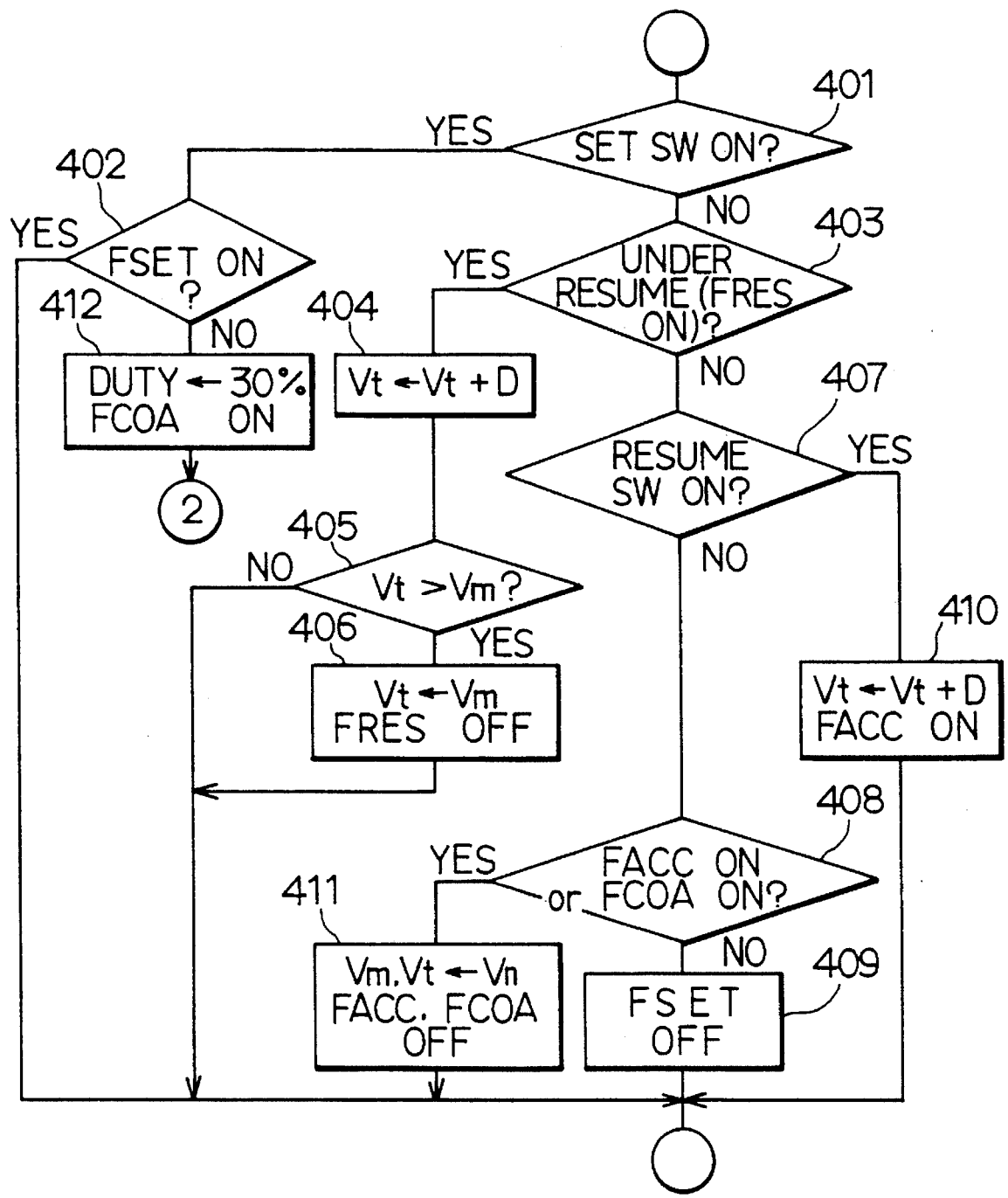
FIG. 4 is a flowchart of accelerate/coast processing therewithin.

The details of accelerate/coast processing (step 400) are indicated in FIG. 4. Firstly, "on" determination of the SET switch 14a (step 401) is performed, and even if on at this time, "on" determination of the "set" flag FSET (step 402) is subsequently performed, but because the "set" flag FSET has already been made to go on in step 202 of set/resume processing, an affirmative determination is made, there is an escape from step 400, and the determination of step 105 is made. Because the flag FPULL is still on, the processing of step 300 is executed again. Additionally, in a case where the SET switch 14a was not pressed in step 401, a negative determination is made and subsequently in step 403 determination is made as to whether resume control to be described later is in progress, "on" determination of the RESUME switch is made in step 407, and determination of flags FACC and FCOA is made in step 408, but negative determinations are made in each step, the flag FSET also goes off (step 409), and next the determination of step 105 is made. Because the flag FPULL is still on, the processing of step 300 is executed again.

In racing control (step 300), as was described above, as long as the IDLE switch 18 is on (step 301), to eliminate play and achieve a substantial degree of opening quickly, duty-establishment processing (step 303) is performed to cause the throttle valve 26 to rotate at high speed in the direction of opening, and the number of repetitions of this processing is counted by the counter PULLINT (step 304).

Thereafter, if the IDLE switch 18 goes off, from step 301 there is subsequently a transition to "on" determination of FPIDL (step 305). In the control cycles up to the previous the flag FPIDL goes on in step 302, and so subsequently the value of the counter PULLINT expressing the number times of fixed-duty cycle signal output up to the present is input to a variable (idle play quantity) IDL expressing play of the throttle valve 26 (step 306). Accordingly, as shown in the following Equation 2, the open-side drive quantity PULL is again calculated on the basis of the memory vehicle speed Vm and the idle play quantity IDL (step 307).

$$\text{PULL} \leftarrow f(Vm) + \text{IDL} \qquad \text{(Equation 2)}$$

Next, the flag FPIDL goes off (step 308), the counter PULLINT is incremented (step 309), open-side duty cycle is established at 95% (step 310), and determination of PULLINT≧PULL is made (step 311). Because initially PULL is larger than PULLINT by f(Vm)−1, in step 311 a negative determination is made and the throttle valve 26 is controlled to the open side at high speed at 95% duty cycle by the processing of the subsequent step 106. Consequently, as long as PULLINT<PULL (more accurately, until PULL-INT=PULL), the throttle valve 26 is rotated to the open side at high speed, and the throttle degree of opening opens rapidly. That is to say, engine output is rapidly caused to rise to achieve the memory vehicle speed Vm established in step 202, and drop in vehicle speed in the period until the actuator 22 achieves a throttle degree of opening which attains the memory vehicle speed Vm is suppressed to the greatest extent possible.

When, by incrementing PULLINT (step 309), PULLINT≧PULL, an affirmative determination is made in step 311 and the flag FPULL goes off (step 312). Because of this, in the subsequent control cycle a negative determination is made in step 105, and duty cycle calculation processing (step 500) is performed.

Figure 7:
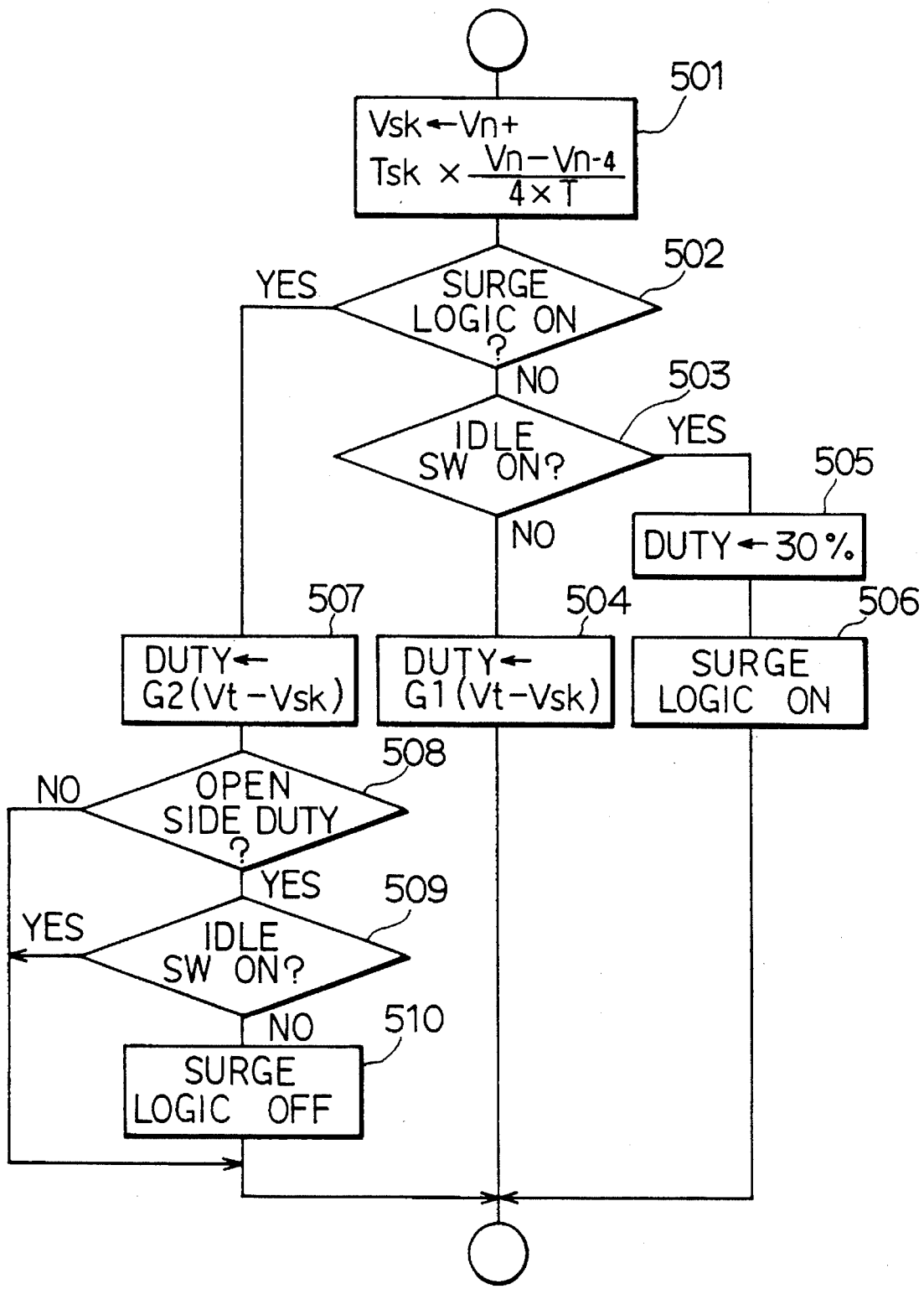
FIG. 7 is a flowchart of duty cycle calculation processing therewithin.

The details of duty cycle calculation processing (step 500) are indicated in FIG. 7. Firstly, skip speed (Vsk), which is advanced vehicle speed, is calculated as shown in the following Equation 3 (step 501) on the basis of the present vehicle speed Vn, skip time Tsk and a vehicle speed differential value (in actuality, determined by dividing the difference between the vehicle speed Vn and vehicle speed $V_{(n-4)}$ of four control cycles before by the time for four control cycles).

$$\text{Vsk} \leftarrow Vn + Tsk \times (Vn - V_{(n-4)})/4T \qquad \text{(Equation 3)}$$

That is to say, Vsk is a value of predicted vehicle speed after skip time Tsk.

Next, "on" determination of surge countermeasure logic (step 502) is performed. Because initially this is off, "on" determination of the IDLE switch 18 (step 503) is performed next. Other than immediately prior to entry into constant-speed cruise control, the IDLE switch 18 may go on for example, in a case of entry from a level road into a steep descending slope during constant-speed cruise control. The condition of step 503 signifies a condition where the possibility of fuel cutoff in the electronic-control fuel-injection device 30 is strong. Of course, as a condition in step 503, a condition of fuel cutoff itself, i.e., a condition wherein the "on" state of the IDLE switch 18 continues for 500 msec, is also acceptable.

Figure 9:
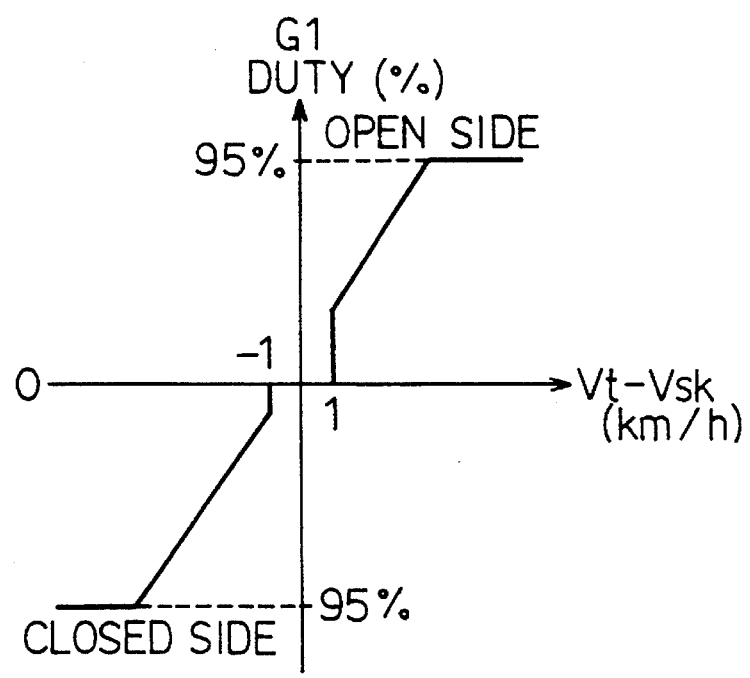
FIG. 9 is a map for calculating duty cycle from difference at a normal condition.

In a case where the IDLE switch 18 is off on a level road or the like, there is a transition to the processing of step 504, and the duty cycle signal DUTY for driving the motor 22a is calculated from the value (Vt−Vsk: km/h) of subtraction of the skip vehicle speed Vsk from the target vehicle speed Vt in accordance with the map G1 indicated in FIG. 9. The higher this duty cycle signal DUTY is, the faster becomes the rotational speed of the motor 22a, and the throttle valve 26 is rotated at high speed. This is expressed by an equation as shown in the following Equation 4.

$$\text{DUTY} \leftarrow G1 (Vt - Vsk) \qquad \text{(Equation 4)}$$

In FIG. 9, the throttle open side is illustrated above the horizontal axis, and the throttle closed side is illustrated below the horizontal axis. The maximum values thereof are, for example, both established at 95% duty cycle. Additionally, an insensitive zone is provided within the range that a difference (Vt−Vsk) is less than 1 and more than −1. In this insensitive zone, the throttle degree of opening is not changed, by making output duty cycle signal to the motor 22a to be 0% DUTY. This is to prevent drive output to the motor 22a from becoming complicated.

By establishing the map G1 as described above, when $Vt-Vsk \geq 1$, output duty cycle to open the throttle valve increases more the larger the difference becomes, with an upper limit of 95%. That is to say, the larger the difference is, the faster grows the throttle degree of opening toward the open side.

Additionally, when $Vt-Vsk \geq -1$, output duty cycle to close the throttle valve increases more the smaller the difference becomes, with an upper limit of 95%. That is to say, the smaller is the difference, the faster grows the throttle degree of opening toward the closed side.

Thereafter, as long as the conditions do not change, the processing of steps 101, 102, 103, 104, 108, 109, 401, 403, 407, 408, 409, 105, 501, 502, 503, 504, and 106 is executed repeatedly in every respective control cycle, feedback control is provided so that the vehicle speed Vn becomes the target vehicle speed Vt, and constant-speed cruise control is achieved.

If from this state a steep descending slope is encountered, it becomes difficult to lower to the target vehicle speed Vt even by successively making the throttle degree of opening smaller, and the IDLE switch 18 goes on during constant-speed cruise control, an affirmative determination is made in step 503, and a 30% duty of the open side is established (step 505). In this way, the throttle degree of opening comes once to be made a certain extent larger. Because fuel cutoff is performed by the electronic-control fuel-injection device 30 to conserve fuel if an "on" state of the IDLE switch 18 continues for a predetermined time, this is to cause fuel cutoff not to be performed by enlarging the throttle degree of opening or to stop fuel cutoff quickly, preventing a sudden drop in vehicle speed and improving physical sensations if only by a little.

Next, the surge countermeasure logic is made to go on (step 506). Because of this, in the step 500 of the subsequent control cycle and after, an affirmative determination is made in step 502, and the duty cycle DUTY for driving the motor 22a is calculated from the difference (Vt-Vsk: km/h) in accordance with the map G2 indicated in FIG. 10 (step 507). The higher is this duty cycle DUTY, the faster becomes the rotational speed of the motor 22a, and the throttle valve 26 is rotated at high speed, similar to the case indicated in FIG. 9. This is expressed by an equation as shown in the following Equation 5.

$$DUTY \leftarrow G2\ (Vt-Vsk) \qquad \text{(Equation 5)}$$

Figure 10:
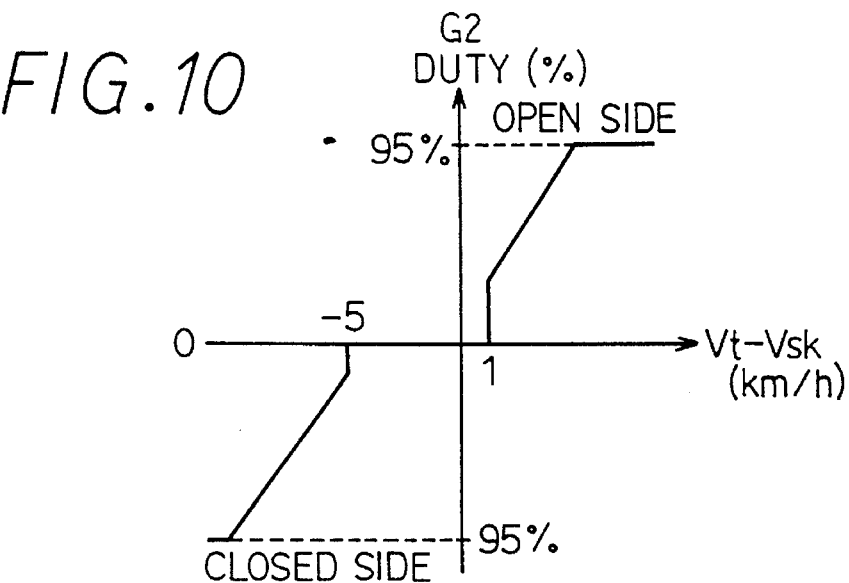
FIG. 10 is a map for calculating duty cycle from difference during fuel cutoff.
Figure 10:
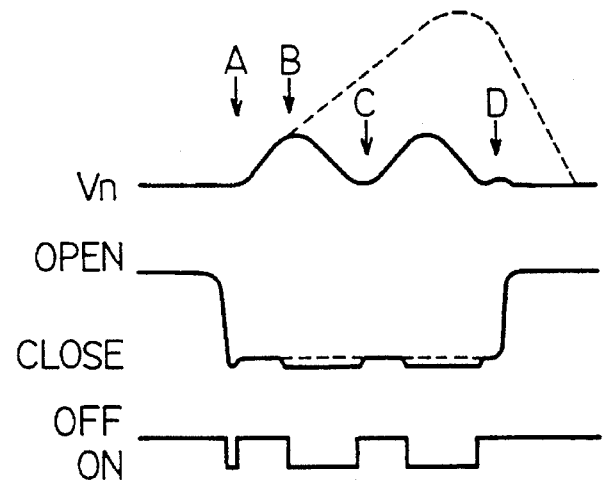
Figure 10:
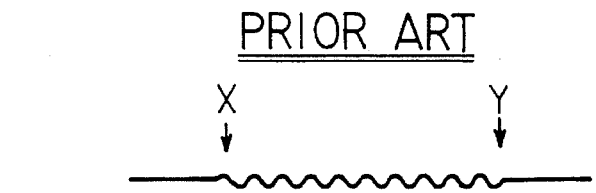
Figure 10:
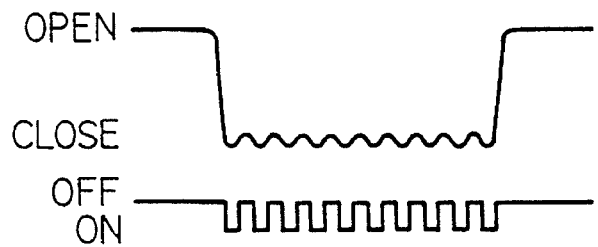

A point of difference between the map G2 of this FIG. 10 and the map G1 of FIG. 9 is the widened width of the insensitive zone on the closed side. That is to say, the insensitive zone is a difference of less than 1 (km/h) on the open side, but on the closed side is disposed in a region where the difference is up to −5 (km/h). This is so as not to cause the throttle valve 26 to rotate to the closed side even if the target vehicle speed Vt is exceeded by a small amount, and on the closed side, signifies blunting of regulation of drive power by the throttle valve 26 in correspondence with the enlarged insensitive zone.

In a case where it is determined that the duty cycle calculated in step 507 is on the throttle open side (step 508) and moreover it is determined that the IDLE switch 18 is off (509), this surge countermeasure logic goes off (step 510) and there is again a return to the normal duty calculation of step 504.

According to the present embodiment, during constant-speed cruise control, if a condition of strong possibility of fuel cutoff (step 503) is not satisfied, duty calculation in accordance with the map G1 of FIG. 9 is performed; if a condition of strong possibility of fuel cutoff (step 503) is satisfied, regulation of the throttle degree of opening is blunted and duty calculation in accordance with the map G2 of FIG. 10 is performed.

Because of this, as shown by the solid line in FIG. 11, the fluctuation cycle of vehicle speed Vn becomes large even if fuel cutoff occurs while the IDLE switch 18 is on, and so deterioration of physical sensations can be prevented. That is to say, even if a steep descending slope is encountered with the timing of A and a condition of strong possibility of fuel cutoff is satisfied, in step 505 the throttle degree of opening is immediately and slightly opened and the IDLE switch 18 goes off, and so the electronic-control fuel-injection device 30 can be prevented from actually entering into fuel cutoff processing. Consequently, vehicle speed immediately rises with no drop, and moreover regulation to the closed side of the throttle degree of opening on the negative side of the difference (Vt-Vsk) is blunted by enlargement of the insensitive zone, and so the throttle degree of opening does not change and the rise in vehicle speed Vn continues for a while. Accordingly, if the insensitive zone is exceeded and the difference (Vt-Vsk) comes to be less than or equal to −5 with the timing of B, driving so that the throttle degree of opening becomes smaller is performed for the first time, the IDLE switch 18 goes on, fuel cutoff begins, and vehicle speed Vn drops. Accordingly, if the difference (Vt-Vsk) comes to be greater than or equal to 1 with the timing of C, driving so that the throttle degree of opening becomes larger is performed, the IDLE switch 18 goes off, and fuel cutoff ends, and so vehicle speed again rises. Thereafter, vehicle speed change with a large cycle is repeated until the timing of D whereat the steep descending slope ends. After the timing of D, when there is a return from the steep descending slope to a level road, vehicle speed drops and so the throttle degree of opening is opened, and because output duty cycle is made so that the IDLE switch 18 goes off and the motor 22a goes to the open side, surge countermeasure logic ends and a return to normal control is possible.

Cancel processing will be described next. Cancel processing is processing (step 600) to terminate constant-speed cruise control when the CANCEL switch 14c of the control switches 14 has been pressed during constant-speed cruise control (step 108), or when the STOP lamp switch 16 has been made to go on by depressing the brake (step 109).

Figure 8:
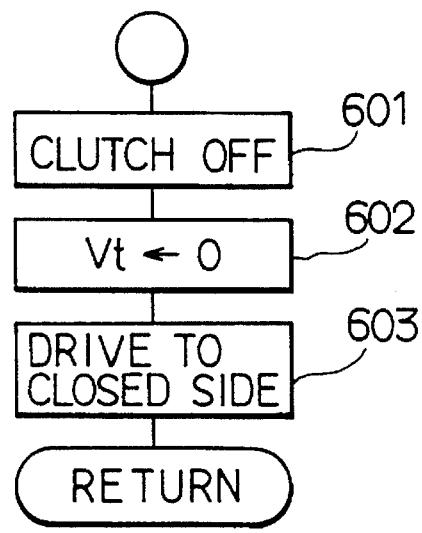
FIG. 8 is a flowchart of cancel processing therewithin.

The details of cancel processing are indicated in FIG. 8. Firstly, the clutch 22b goes off (step 601), the target vehicle speed Vt is cleared to zero (step 602), the motor 22a is continuously electrified to the closed side (step 603), and the degree of opening of the actuator 22 itself is caused to return to fully closed. At this time, the memory vehicle speed Vm is maintained unchanged without being cleared to zero.

Resume processing will be described next. Resume processing causes vehicle speed to be restored from the present vehicle speed up to memory vehicle speed Vm in a case where the RESUME switch 14b has been pressed in a state where constant-speed cruise control is not in progress and a memory vehicle speed Vm is in memory.

Firstly, determination that control is not in progress is made in step 104, and subsequently the processing of step 200 is entered, and if the SET switch 14a is off in step 201, it is determined whether the RESUME switch 14b is on (step 208). If the RESUME switch 14b is on and moreover the memory vehicle speed Vm is not zero, i.e., if a setting for memory vehicle speed Vm has been made (step 209), the present vehicle speed Vn is established to be the target vehicle speed, the clutch 22b goes on, and a flag FRES to indicate that resume is in progress goes on (step 210). Accordingly, the processing of steps 105, 500, and 106 is performed.

In the subsequent control cycle, an affirmative determination is made is step 104, steps 108 and 109 are passed through, step 400 is entered, a negative determination is made in step 401, and it is determined whether resume control is in progress (step 403). That is to say, "on" determination of the flag FRES is performed. An affirmative determination is made in step 403, and the target vehicle speed Vt is increased by a uniform vehicle speed D (step 505). Accordingly, it is determined whether the target vehicle speed Vt is larger than the memory vehicle speed Vm (step 405). If Vt≧Vm, the processing of steps 105, 500, and 106 is subsequently performed. Consequently, as long as Vt≧Vm, the processing of steps 105, 500, and 106 is executed and vehicle speed Vn is caused to rise while causing the target vehicle speed Vt to rise a little at a time. Accordingly, if the result of rise in target vehicle speed Vt in step 404 is that Vt has become larger than Vm, the memory vehicle speed Vm has been established to be the target vehicle speed Vt and the flag FRES goes off (step 406).

In the subsequent control cycle, a negative determination is made in step 403, and because the RESUME switch 14b has already been released, on determination of the RESUME switch 14b in the subsequent step 407 is determined in the negative, the "on" determination of the flag FACC or the flag FCOA of step 408 is also determined in the negative, the flag FSET goes off (step 409), and subsequently steps 105, 500, and 106 are executed and constant-speed cruise control is obtained.

Acceleration processing will be described next. Acceleration processing performs speed-increase control when the RESUME switch 14b has been pressed during constant-speed cruise control, and shifts to constant-speed cruise control taking, as the target vehicle speed Vt, the vehicle speed Vn at the time when the RESUME switch 14b is thereafter released. Firstly, when it is determined in the determination of step 104 that constant-speed cruise control is in progress, steps 108 and 109 are passed through and step 400 is entered, there is a transition from step 401 to step 403, and it is determined in the determination of step 403 that "resume" control is not in progress, "on" determination of the RESUME switch 14b of step 407 is determined in the affirmative. Because of this, the target vehicle speed Vt is caused to increase by a uniform vehicle speed D, and the flag FACC to indicate that accelerate control is in progress goes on (step 410). In the step 500 thereafter, the target vehicle speed Vt increased by the amount D is employed to calculate the drive duty cycle of the motor 22a and control is performed so that the vehicle speed Vn matches the increased target speed Vt. Because of this, speed-increase control is attained. As long as the RESUME switch 14b continues to be depressed, the target speed Vt rises within a predetermined speed of a legal speed limit or the like as an upper limit, and vehicle speed Vn increases.

When accelerate control is terminated, if the RESUME switch 14b is released, a negative determination is made in step 407, in step 408 the flag FACC is on and so an affirmative determination is made, the present vehicle speed Vn is established to be the memory vehicle speed Vm and the target vehicle speed Vt, and moreover the flags FACC and FCOA go off (step 411). In this way, there is a shift to constant-speed cruise control.

Coast processing will be described next. Coast processing performs deceleration control when the SET switch 14a has been pressed during constant-speed cruise control, and shifts to constant-speed cruise control taking, as the target vehicle speed Vt, the vehicle speed Vn at the time when the SET switch 14a is thereafter released. Firstly, when it is determined in the determination of step 104 that constant-speed cruise control is in progress, steps 108 and 109 are passed through and step 400 is entered, and in the determination of step 401 it is determined that the SET switch 14a is on. Because the flag FSET has already gone off in step 409, a negative determination is made in step 402, fixed-duty cycle output (for example 30%) is established to drive the motor 22a to the closed side, and the flag FCOA to indicate that coast control is in progress goes on (step 412). Accordingly, after the duty output of step 106 there is a transition to the subsequent control cycle. Moreover, the "on" determination of the flag FSET in step 402 is performed to discriminate between the SET switch 14a being on during setting operation and the SET switch 14a being on for coasting.

When coast control is terminated, the SET switch 14a is released and so there is passage from step 401 through steps 403 and 407 to step 408, and because the flag FCOA is on thereat, the present vehicle speed Vn is subsequently established to be the memory vehicle speed Vm and the target vehicle speed Vt, and moreover the flags FACC and FCOA go off (step 411). In this way, there is a shift to constant-speed cruise control.

Constant-speed cruise control is performed as described above. In particular, the fluctuation cycle of vehicle speed is made large even if fuel cutoff or surge occurs, and so there is no deterioration in physical sensations.

According to the foregoing embodiment, steps 501 and 504 correspond to processing as means for regulating drive power, step 503 corresponds to processing as means for detecting a fuel cutoff condition, and steps 505 and 507 correspond to processing as means for blunting regulation.

According to the foregoing embodiment, as shown in the map of FIG. 10, an insensitive zone was enlarged only on the closed side as fuel cutoff/surge countermeasure logic, but deceleration not less than a predetermined value can be allowed by conversely enlarging only on the open side, and the fuel cutoff/surge cycle can be lengthened. Moreover, it is also acceptable to expand an insensitive zone on both the closed side and the open side, and the fluctuation cycle of vehicle speed becomes still longer.

Step 503 signifies a condition where the possibility of fuel cutoff is strong, but it is also acceptable to be the fuel cutoff condition itself. Additionally, if another fuel cutoff condition is employed by the electronic-control fuel-injection device 30, the condition thereof or a similar condition may be entered in step 503.

Additionally, according to the foregoing embodiment, Vt−Vsk, i.e., a value obtained by subtracting from target vehicle speed Vt a vehicle speed Vsk to be reached after time Tsk, was taken to be the difference, but Vt−Vn is also acceptable, and it is also acceptable to further add or subtract a constant with respect to Vt−Vn as the difference.

In addition, it is also acceptable for step 507 to be a state where there is no map of the closed side, i.e., to prohibit closed-side output. In this case, the drive power is kept at a predetermined value and the vehicle-speed changes indicated in FIGS. 11A and 11B become as shown by the broken line, and steps 505 and 507 correspond to processing as means for stopping regulation.

Furthermore, it is also acceptable for the blunting of throttle degree of opening regulation in the map G2 indicated in FIG. 10 not only to enlarge the insensitive zone but to make the duty cycle established in accordance with the difference to be smaller overall, and additionally it is also acceptable to achieve change in duty cycle corresponding to change in the difference, i.e., a smaller slope of the map G2.

What is claimed is:

1. A constant-speed cruise control device for a vehicle provided with a fuel cutoff control device to stop fuel supply to an internal combustion engine in a case where a fuel cutoff condition has been obtained, said constant-speed cruise control device comprising:

vehicle speed detecting means for detecting a vehicle speed of a vehicle;

drive power regulating means, connected to said vehicle speed detecting means, for regulating drive power of said internal combustion engine to cause vehicle speed to match a target cruising speed and a comparative speed based on the vehicle speed detected by said vehicle speed detecting means during constant-speed cruise control;

fuel cutoff condition detecting means for detecting when at least one of a fuel cutoff condition and a condition wherein a possibility of fuel cutoff is strong has been obtained, said fuel cutoff condition detecting means being a switch, said switch assuming a first state under a condition when the possibility of fuel cutoff is strong and a condition when fuel cutoff occurs, said switch assuming a second state when the possibility of fuel cutoff is weak; and increasing means, connected to said fuel cutoff condition detecting means and responsive thereto, for increasing drive power of said internal combustion engine to avoid execution of said fuel cutoff control by said fuel cutoff control device when, during constant-speed cruise control, said switch assumes said first state.

2. A constant-speed cruise control device for a vehicle according to claim 1, wherein said drive power regulating means is further for driving a throttle of said internal combustion engine and regulates drive power of said internal combustion engine by regulating a throttle degree of opening of said internal combustion engine.

3. A constant-speed cruise control device for a vehicle according to claim 2, wherein said fuel cutoff condition detecting means is further for driving said throttle and detects that said fuel cutoff condition has been obtained when said throttle degree of opening approaches zero.

4. A constant-speed cruise control device for a vehicle according to claim 1, wherein said drive power regulating means stops regulating said drive power of said internal combustion engine when an absolute value of said difference between said comparative speed and said target cruising speed is lower than a predetermined value.

5. A constant-speed cruise control device for a vehicle according to claim 4, further comprising changing means, connected to said increasing means, for changing said predetermined value so that a limit where said drive power regulating means stops regulating said drive power is enlarged after said increasing means increases said drive power.

6. A constant-speed cruise control device for a vehicle according to claim 5, wherein said changing means is connected to said vehicle speed detecting means and is further for changing said predetermined value only when said comparative speed is higher than said target cruising speed.

7. A constant-speed cruise control device for a vehicle according to claim 5, wherein said changing means is connected to said vehicle speed detecting means and is further for changing said predetermined value only when said comparative speed is lower than said target cruising speed.

8. A constant-speed cruise control device for a vehicle according to claim 1, wherein said increasing means is further for driving a throttle of said internal combustion engine and increases said drive power by increasing said throttle degree of opening.

9. A constant-speed cruise control device for a vehicle according to claim 1, wherein said increasing means is implemented using a microprocessor.

10. A constant-speed cruise control device for a vehicle provided with a fuel cutoff control device to stop fuel supply to an internal combustion engine in a case where a fuel cutoff condition has been obtained, said constant-speed cruise control device comprising:

vehicle speed detecting means for detecting a vehicle speed of said vehicle;

drive power regulating means, connected to said vehicle speed detecting means, for regulating drive power of said internal combustion engine to cause the vehicle speed to match a target cruising speed based on a difference between the target cruising speed and a comparative speed based on the vehicle speed detected by said vehicle speed detecting means during constant-speed cruise control;

fuel cutoff condition detecting means for detecting when at least one of a fuel cutoff condition and a condition wherein a possibility of fuel cutoff is strong has been obtained, said detecting means assuming a first state under a condition when the possibility of fuel cutoff is strong and a condition when fuel cutoff occurs, said detecting means assuming a second state when the possibility of fuel cuttoff is weak;

stopping means, connected to said drive power regulating means, for stopping regulation of said drive power by said drive power regulating means when an absolute value of said difference is a predetermined value or less; and changing means, connected to both said stopping means and said fuel cutoff condition detecting means and responsive to said detecting means, for changing said predetermined value so that a limit where said drive power regulating means stops regulating said drive power is enlarged when said fuel cutoff condition detecting means during constant-speed cruise control assumes said first state.

11. A constant-speed cruise control device for a vehicle according to claim 10, wherein said changing means changes said predetermined value only when said comparative speed is higher than said target cruising speed.

12. A constant-speed cruise control device for a vehicle according to claim 10, wherein said changing means changes said predetermined value only when said comparative speed is lower than said target cruising speed.

13. A constant-speed cruise control device for a vehicle according to claim 10, wherein said changing means changes said predetermined value on both sides where said comparative speed is larger and smaller than said target cruising speed.

14. A constant-speed cruise control device for a vehicle according to claim 10, wherein said drive power regulating means regulates said drive power of said internal combustion engine by regulating a throttle degree of opening of said internal combustion engine, and said fuel cutoff condition detecting means detects that said fuel cutoff condition has been obtained when said throttle degree of opening approaches zero.

15. A constant-speed cruise control device for a vehicle according to claim 10, wherein said drive power regulating means regulates said drive power of said internal combustion engine by at least one of a regulated quantity and a regulated speed determined from said difference based on a map established previously to indicate a relationship between said difference and at least one of a regulated quantity and a regulated speed; and said changing means for changing said predetermined value by replacing said map to another map.

16. A constant-speed cruise control device for a vehicle provided with a fuel cutoff control device to stop fuel supply to an internal combustion engine in a case where a fuel cutoff condition has been obtained, said constant-speed cruise control device comprising:

vehicle speed detecting means for detecting a vehicle speed of a vehicle;

drive power regulating means, connected to said vehicle speed detecting means, for regulating drive power of said internal combustion engine to cause vehicle speed to match a target cruising speed and a comparative speed based on the vehicle speed detected by said vehicle speed detecting means during constant-speed cruise control;

fuel cutoff condition detecting means for detecting when at least one of a fuel cutoff condition and a condition wherein a possibility of fuel cutoff is strong has been obtained, said fuel cutoff condition detecting means being a switch, said switch assuming a first state under a condition when the possibility of fuel cutoff is strong and a condition when fuel cutoff occurs, said switch assuming a second state when the possibility of fuel cutoff is weak; and increasing means, connected to said fuel cutoff condition detecting means and responsive thereto, for increasing drive power of said internal combustion engine to avoid execution of said fuel cutoff control by said fuel cutoff control device when, during constant-speed cruise control, said switch assumes said first state;

wherein said drive power regulating means stop regulating said drive power of said internal combustion engine when an absolute value of said difference between said comparative speed and said target cruising speed is lower than a predetermined value; and said constant-speed cruise control device further comprises changing means, connected to said increasing means, for changing said predetermined value so that a limit where said drive power regulating means stops regulating said drive power is enlarged after said increasing means increases said drive power.

17. A constant-speed cruise control device for a vehicle provided with a fuel cutoff control device to stop fuel supply to an internal combustion engine in a case where a fuel cutoff condition has been obtained, said constant-speed cruise control device comprising:

vehicle speed detecting means for detecting a vehicle speed of a vehicle;

drive power regulating means, connected to said vehicle speed detecting means, for regulating drive power of said internal combustion engine so as to cause vehicle speed to match a target cruising speed based on a difference between the target cruising speed and a comparative speed based on the vehicle speed detected by said vehicle speed detecting means during constant-speed cruise control;

fuel cutoff condition detecting means for detecting when at least one of a fuel cutoff condition and a condition wherein a possibility of fuel cutoff is strong has been obtained, said detecting means assuming a first state under a condition when the possibility of fuel cutoff is strong and a condition when fuel cutoff occurs, said detecting means assuming a second state when the possibility of fuel cutoff is weak;

increasing means, connected to said fuel cutoff condition detecting means and responsive to said detecting means, for increasing drive power of said internal combustion engine to avoid execution of said fuel cutoff control by said fuel cutoff control device when said fuel cutoff condition detecting means during constant-speed cruise control assumes said first state, wherein said drive power regulating means stops regulating said drive power of said internal combustion engine when an absolute value of said difference between said comparative speed and said target cruising speed is lower than a predetermined value, and changing means connected to said increasing means, for changing said predetermined value so that a limit where said drive power regulating means stops regulating said drive power is enlarged after said increasing means increases said drive power, and wherein said changing means is connected to said vehicle speed detecting means and operates to change said predetermined value only when said comparative speed is higher than said target cruising speed.

18. A constant-speed cruise control device for a vehicle provided with a fuel cutoff control device to stop fuel supply to an internal combustion engine in a case where a fuel cutoff condition has been obtained, said constant-speed cruise control device comprising drive power regulating means for regulating drive power of said internal combustion engine so as to cause vehicle speed to match a target cruising speed based on a difference between the target cruising speed and a comparative speed based on the vehicle speed detected by said vehicle speed detecting means during constant-speed cruise control;

fuel cutoff condition detecting means for detecting when at least one of a fuel cutoff condition and a condition wherein a possibility of fuel cutoff is strong has been obtained, said detecting means assuming a first state under a condition when the possibility of fuel cutoff is strong and a condition when fuel cutoff occurs, said detecting means assuming a second state when the possibility of fuel cutoff is weak;

increasing means connected to said fuel cutoff condition detecting means and responsive to said detecting means, for increasing drive power of said internal combustion engine to avoid execution of said fuel cutoff control by said fuel cutoff control device when said fuel cutoff condition detecting means during constant-speed cruise control assumes said first state, wherein said drive power regulating means stops regulating said drive power of said internal combustion engine when an absolute value of said difference between said comparative speed and said target cruising sped is lower than a predetermined value, and changing means connected to said increasing means for changing said predetermined value so that a limit where said drive power regulating means stops regulating said drive power is enlarged after said increasing means increases said drive power, wherein said changing means is connected to said vehicle speed detecting means and operates to change said predetermined value only when said comparative speed is lower than said target cruising speed.

* * * * *